United States Patent [19]

Niinae

[11] Patent Number: 5,595,849
[45] Date of Patent: Jan. 21, 1997

[54] RESIN COMPOSITIONS FOR ELECTROPHOTOGRAPHIC TONER

[75] Inventor: Takashi Niinae, Kyoto, Japan

[73] Assignee: Sanyo Chemical Industries, Ltd., Kyoto, Japan

[21] Appl. No.: 390,572

[22] Filed: Feb. 17, 1995

[30] Foreign Application Priority Data

Feb. 17, 1994 [JP] Japan .................................. 6-044871

[51] Int. Cl.$^6$ ........................... G03G 9/087; G03G 9/083
[52] U.S. Cl. ..................... 430/106.6; 430/109; 430/111
[58] Field of Search ..................... 430/109, 111, 430/106.6

[56] References Cited

U.S. PATENT DOCUMENTS 4,518,673  5/1985  Noguchi et al. .......................... 430/108
4,883,735  11/1989  Watanabe et al. ....................... 430/109

FOREIGN PATENT DOCUMENTS 0276963  8/1988  European Pat. Off. .
0573705  12/1993  European Pat. Off. .
3315154  11/1983  Germany .

OTHER PUBLICATIONS

Patent Abstracts of Japan, vol. 6, No. 96 (P–120), Jun. 4, 1982 and Database WPI, Derwent Publications, AN–82–24964E, JP–57–030848, Feb. 19, 1982.

*Primary Examiner*—Mark F. Huff
*Attorney, Agent, or Firm*—Oblon, Spivak, McClelland, Maier & Neustadt, P.C.

[57] ABSTRACT

A resin composition suitable for a toner, more particularly, a resin composition suitable as a binder for an electrophotographic toner is disclosed.

13 Claims, No Drawings

RESIN COMPOSITIONS FOR ELECTROPHOTOGRAPHIC TONER

BACKGROUND OF THE INVENTION

1. Field of the Invention

This invention relates to a resin composition suitable for a toner. More particularly, it relates to a resin composition suitable as a binder for an electrophotographic toner.

2. Description of the Prior Art

In electrophotography (xerography), for fixing electrostatic latent images visualized by use of a developing toner, there have been widely used methods using fixing means of contact heating, such as those with a heated roller and those via a film between a heater and paper or the like (for example, JPN Patent Lay-open Nos. 70688/1992 and 12558/1992). In these methods, it is desired that the minimum temperature for fixing (hereinafter referred to as MFT) is low (low temperature fixing properties) and the temperature causing offset to the heated roller (hereinafter referred to as HOT) is high (anti-hot offset properties). Thermal shelf stabilities is also desired so as not to cause coagulation (or agglomeration) and reduction of flowability under heat evolved from fixers within electrophotographic machines.

In order to meet these requirements, there have been heretofore proposed various techniques using toner binders having a wide range of molecular weight distribution from lower molecular weight to higher molecular weight and having a glass transition temperature (hereinafter referred to as Tg) of 50°–80° C. (for example, JPN Patent Publication No. 20411/1985 and JPN Patent Lay-open No. 215558/1986), and those using toners mainly composed of heat reaction products of non-crystallizable polyester resins with vinyl copolymer resins (for example JPN Patent Lay-open No. 277074/1990), those using toners composed of a vinyl resin as a discontinuous domain and a polyester resin as a continuous matrix, and a dispersing diameter of vinyl resin of at most 5 µm (U.S. Pat. No. 5,250,382), those using toners composed of a vinyl resin as a continuous matrix and a polyester resin as a discontinuous domain, and a dispersing polyester resin with a diameter of at least 0.5 µm (JPN Patent Lay-open No. 260062/1985), and those using toners prepared by solution copolymerization of styrenic monomers with acrylate monomers in the presence of saturated polyester resins (JPN Patent Publication No. 25057/1989).

In these techniques, there are drawbacks, that the formers cannot sufficiently answer to fixing properties at lower temperature required in recent high speed facsimile or copy machines, or to higher thermal shelf stability desired accompanied with miniaturization of printers; and that the latter results in poor dispersability of colorants and charge controllers, insufficient frictional charge amount, libility of vinyl resin bleeding out of the polyester resin matrix to toner surface, and difficulty in viscosity reduction.

Toners disclosed in U.S. Pat. No. 5,250,382, result in a difficulty in viscosity reduction.

Toners controlled by a dispersing diameter of polyester resin of at least 0.5 µm by mixing time of toners, disclosed in JPN Patent Lay-open No. 260062/1985, results in poor low temperature fixing properties.

Toners with uniform dispersing of polyester by copolymerization of styrenic monomers with acrylate monomers in the presence of a solvent and a saturated polyester which is not dissolved in styrenic monomers or acrylate monomers, disclosed in JPN Patent Publication No. 2507/1989, result in poor low temperature fixing properties.

Accordingly, a toner resin with both a low MFT and a high HOT is still being sought.

SUMMARY OF THE INVENTION

It is an object of the present invention to provide a resin composition capable of providing a toner having desired properties of low MFT and high HOT.

It is another object of the present invention to provide a toner binder of improved thermal shelf stability.

It is still another object of the present invention to provide a toner of improved electrical properties, such as frictional charge amount.

Briefly, these and other objects of this invention as hereinafter will become more readily apparent having been attained broadly by a resin composition suitable for electrophotographic toner comprising:

(A) a styrenic polymer or a copolymer of a styrenic monomer with (meth)acrylic monomer or maleic monomer, (B) a non-crosslinked, non-crystallizable polymer having a polar group, wherein:

(1) the weight ratio of (B)/(A) is in the range of (0.01–0.5)/1;

(2) said resin composition has at least one Tg in the range of 50°–70° C.;

(3) (B) has a Tg in the range of 15°–55° C., and (A) has a Tg higher than that of (B);

(4) the ratio of the weight average molecular weight of said resin composition (Mwd), to the weight average molecular weight of (B) (Mwb) (Mwd/Mwb), is in the range of 20–1,000;

(5) (B) has a number average molecular weight (Mnb) in the range of 500–2,500; and (6) (A) and (B) have solubility parameters, satisfying the following equation (1);

$$-5.5 \times 10^{-4} \text{ Mnb} + 0.74 \leq SPb - SPa \leq -5.5 \times 10^{-4} \text{ Mnb} + 1.39 \qquad (1)$$

wherein SPa is the solubility parameter of (A), and SPb is the solubility parameter of (B).

DETAILED DESCRIPTION OF THE PREFERRED EMBODIMENTS

As component (A) a styrenic polymer or a copolymer of a styrenic monomer and (meth)acrylic monomer (acrylic monomer and/or methacrylic monomer may be used; similar expressions are used hereinafter) or maleic monomer.

Suitable styrenic monomers (a) include, for example, styrene, α-methylstyrene, p-methoxystyrene, p-acetoxystyrene and p-hydroxystyrene.

Suitable examples of (meth)acrylic monomer and maleic monomer (b) include (meth)acrylic acid; $C_{1-50}$ alkyl (meth)acrylates, such as methyl (meth)acrylate, ethyl (meth)acrylate, butyl (meth)acrylate, lauryl (meth)acrylate and stearyl (meth)acrylate; maleic acid anhydride and maleic acid monobutyl ester.

Among these, preferred are a styrenic polymer and a copolymer of a styrenic monomer and (meth)acrylic monomer. More preferred is a copolymer of a styrene and a (meth)acrylic monomer, particularly methyl (meth)acrylate or butyl (meth)acrylate.

A weight ratio of (a) a styrenic monomer, and (b) (meth-)acrylic monomer or maleic monomer, composing (A), (a)/(b) is generally (98-50)/(2-50), preferably (95-60)/(5-40).

A weight average molecular weight (hereinafter referred to as Mw) of (A) is generally 50,000–500,000. And a Tg of (A) is generally 50°–75° C.

Mw of (A) is controlled so as to provide a ratio of the weight average molecular weight of said resin composition to the weight average molecular weight of (B), (Mwd/Mwb) preferably in the range of 20–1,000. A Mwd/Mwb lower than 20 results in a decrease of HOT, and a Mwd/Mwb over 1,000 causes poor low temperature fixing properties. Mw can be measured by GPC (gel permeation chromatography) using tetrahydrofuran (hereinafter referred to as THF) with use of a calibration curve of standard polystyrenes.

In order to attain (A) of a broader molecular weight distribution, a relatively lower molecular weight portion and a higher molecular weight portion may be polymerized separately, or one of these portions may be polymerized in the presence of the rest of them. Polymerization methods include suspension polymerization, solution polymerization and bulk polymerization.

The weight ratio of (B)/(A) is preferably in the range of (0.01–0.5)/1, more preferably (0.02–0.4)/1. A (B)/(A) lower than 0.01/1 results in poor low temperature fixing properties, and a (B)/(A) over 0.5/1 causes poor thermal shelf stability.

(B) generally has a number average molecular weight (hereinafter referred to as Mn) (Mnb) in the range of 500–2,500, preferably 800–2,400. And Mw of (B) is generally 500–7,500, preferably 800–7,000.

A Mnb lower than 500 results in poor thermal shelf stability, and a Mnb over 2,500 causes poor low temperature fixing properties.

The resin composition may have two or more Tg but has at least one Tg in the range of 50°–70° C. Thermal shelf stability becomes poor in case of no Tg being present at 50° C. or more while low temperature fixing properties become poor without a Tg≦70° C.

(B) preferably has a Tg in the range of 15°–55° C., more preferably 20°–50° C., and the Tg is lower than that of (A). A Tg of (B) lower than 15° C. results poor thermal shelf stability, and a Tg over 55° C. causes poor low temperature fixing properties.

(A) and (B) generally have solubility parameters (hereinafter referred to as SP), satisfying the following equation;

$$-5.5 \times 10^{-4}\, Mnb + 0.74 \leq SPb - SPa \leq -5.5 \times 10^{-4}\, Mnb + 1.39 \quad (1),$$

preferably $$-5.5 \times 10^{-4}\, Mnb + 0.78 \leq SPb - SPa \leq -5.5 \times 10^{-4}\, Mnb + 1.39 \quad (2),$$

or $$-5.5 \times 10^{-4}\, Mnb + 0.74 \leq SPb - SPa \leq -5.5 \times 10^{-4}\, Mnb + 1.35 \quad (3),$$

more preferably $$-5.5 \times 10^{-4}\, Mnb + 0.78 \leq SPb - SPa \leq -5.5 \times 10^{-4}\, Mnb + 1.35 \quad (4),$$

wherein (SPa) is the solubility parameter of (A), and (SPb) is the solubility parameter of (B).

A SPb–SPa lower than $(-5.5 \times 10^{-4}\, Mnb + 0.74)$ results in poor thermal shelf stabilities, because the compatibility of (A) and (B) at room temperature brings about a lower Tg. A SPb–SPa over $-5.5 \times 10^{-4}\, Mnb + 1.39$, causes poor fixing properties, because (A) and (B) are not compatible even at high temperature. The resin composition of the invention provides improved fixing properties, because the melt viscosity of (A) is lowered by adding thereto (B), having a lower molecular weight and a lower Tg than (A).

The inventor has discovered that the combination of (A) and (B) having a specific relation of Sps and Tgs of each (A) and (B) according to the above-mentioned equation has attained improved thermal shelf stabilities, together with low temperature fixing properties.

Sp in the invention is a repeating unit value of a polymer at 25° C. determined according to the method of Fedors. The method is disclosed by R. F. Fedors, in Polym. Eng. Sci., 14(2), 147(1974). Namely, Sp is calculated by the following equation using an evaporation energy and a molar volume of an atom and an atomic group at a structure of a compound;

$$Sp = (\Sigma \Delta ei / \Sigma \Delta vi)^{1/2}$$

wherein $\Delta ei$ is an evaporation energy of an atom or an atomic group, and $\Delta vi$ is a molar volume of an atom or an atom group. In calculating Sp, the number of main chain skeletal atoms in the smallest repeating unit of a copolymer of styrene with (meth)acrylate, styrenic polymer and (meth-)acrylic polymer, is estimated at 2.

Suitable polar groups of (B) of the invention include, for example, hydroxyl group, carboxyl group, sulfonic acid group, amino group, amide group, epoxy group and nitrile group. Among these, hydroxyl group and carboxyl group are preferred.

Examples of polymers suitable as component (B) include polyester, copolymer of styrene with (meth)acrylate monomer, styrenic polymer, (meth)acryl polymer, epoxy resin, polyurethane resin, polyamide resin and polycarbonate resin. Among these, preferred are polyester, copolymer of styrene with (meth)acrylate monomer, styrenic polymer, polyurethane resin and polyamide resin, particularly polyester, polyurethane resin and polyamide resin.

Suitable examples of a polyester of the invention are inclusive of polycondensation products of a diol with dibasic acid (or ester forming derivative thereof).

Suitable diols include low molecular weight diols, for example, (1) aliphatic dihydric alcohols (glycols), such as ethylene glycol, propylene glycol, 1,3- and 1,4-butane diols, 1,6-hexane diol, neopentyl glycol, 3-methyl-1,5-pentane diol, diethylene glycol and triethylene glycol, (2) dihydric phenols, such as hydroquinone, catechol, resorcinol, pyrogallol, and bisphenols (e.g. bisphenol A, bisphenol AD, bisphenol F and bisphenol S (bisphenol sulfone)), (3) cycloaliphatic dihydric alcohols, such as 1,4-dihydroxymethylcyclohexane, and hydrogenated bisphenols, and (4) adducts of alkylene oxide (ones containing 2–4 carbon atoms, such as ethylene oxide and propylene oxide (hereinafter referred to as EO and PO, respectively) and combination of them which may be added blockwise or randomly) to these low molecular weight diols (1), (2) and/or (3); as well as mixtures of two or more of these diols. Among these, preferred are ethylene glycol, neopentyl glycol and alkylene oxide adducts (preferably 2–3 moles adducts) of bisphenols (particularly bisphenol A), and mixtures of them. More preferred are alkylene oxide 2–3 moles adducts of bisphenol A, neopentyl glycol, and mixtures of them.

Suitable dibasic acids include dicarboxylic acids, for example, aliphatic, aromatic and cycloaliphatic ones, such as succinic, maleic, fumaric, itaconic, azelaic, mesaconic, citraconic, sebacic, glutaconic, adipic, malonic, glutaric, phthalic, isophthalic, terephthalic, cyclohexane dicarboxylic, nadic and methyl-nadic acids, alkyl- or alkenyl ($C_{1-20}$)-succinic acids (e.g. octyl-succinic and dodecenyl-succinic acids), and dimer acids, obtainable by dimerization of fatty acids (such as linoleic and linolenic acids); and mixtures of 2 or more of these acids; as well as ester-forming derivatives of these acids, for instance, anhydrides and lower alkyl esters, such as maleic and phthalic anhydrides, dimethyl terephthalate and the like. Among these, preferred are succinic, maleic, fumaric, phthalic, isophthalic, terephthalic, and alkyl- or alkenyl ($C_{4-18}$)-succinic acids.

Polycondensation of diol with dibasic acid or ester-forming derivatives thereof can be carried out under known conditions, for instance, at a temperature of usually 150°–300° C., with or without a catalyst (such as dibutyltin oxide, stannous oxide, tetrabutyl titanate and so on), under normal or reduced pressure, in the absence or in the presence of an inert gas or solvent.

After the polycondensation reaction, acid anhydride can be reacted in order to increase the amount of terminal carboxyl group of polyester, otherwise to decrease the amount of terminal hydroxyl group. Preferred acid anhydride is succinic acid.

In the case where (B) is polyester, an acid number (hereinafter referred to as AV) is generally 0.5–224 mg KOH/g, preferably 0.5–140 mg KOH/g, and a hydroxyl number (hereinafter referred to as OHV) is generally 0.5–224 mg KOH/g, preferably 0.5–140 mg KOH/g.

Suitable vinyl monomers having a polar group used for a copolymer of a styrenic monomer with an ester of (meth)acrylic acid, (meth)acrylate and styrenic polymer of (B) include 2-hydroxyethyl (meth)acrylate, hydroxypropyl (meth)acrylate, 2-hydroxy-3-phenyloxy-propyl(meth)acrylate, hydroxybutyl (meth)acrylate, reaction products of glycidyl (meth)acrylate with (meth)acrylic acid, polyethyleneglycol (meth)acrylate, polypropyleneglycol (meth)acrylate, maleic anhydride, monobutyl maleate, (meth)acrylamide, dimethylaminoethyl (meth)acrylate, diethylaminoethyl (meth)acrylate, (meth)acrylonitrile and p-hydroxystyrene.

Other monomers copolymerizable with above mentioned monomers having polar group are, for example, monomers mentioned above for (A).

(B) can also be obtained by introducing polar groups into polymers containing no polar group, such as a copolymer of styrene with (meth)acrylate, (meth)acrylate polymer and styrenic polymer.

Illustrative examples of such polymers include (1) ones containing a hydroxyl group introduced thereinto, such as a resin of a hydrolyzate of a copolymer of p-acetoxystyrene, and (2) ones containing a sulfonyl group introduced thereinto, such as a sulfonated product of a styrenic copolymer with chlorosulfonic acid.

Suitable examples of polyurethane resin of the invention are inclusive of polyaddition products of an organic diisocyanate with a diol.

Suitable organic diisocyanates include, for example, hexamethylene diisocyanate, isophorone diisocyanate, dicyclohexylmethane diisocyanate, tolylene diisocyanate, diphenylmethane diisocyanate, xylylene diisocyanate and tetramethylxylylene diisocyanate.

Among these, tolylene diisocyanate and diphenylmethane diisocyanate are preferred.

Suitable diols include, for example, above-mentioned dihydric alcohols. Among these, bisphenol EO and/or PO 2–4 mole adducts are preferred.

The polyaddition reaction is generally carried out at 40°–130° C., and can use catalysts such as dibutyltin dilaulate and stannous octoate.

A NCO index of polyurethane resin is generally 50–120, preferably 60–90.

There may be used monohydric alcohol (such as $C_{1-18}$ aliphatic alcohols) or organic monoisocyanate to block terminal isocyanate group or terminal hydroxyl group.

Examples of a polyamide resin are (1) a ring opening polymer of a lactam, (2) a polycondensate of an aminocarboxylic acid or (3) a polycondensate of a dicarboxylic acid and a diamine. Examples of lactams (1) are caprolactam, enantholactam, laurolactam and undecanolactam. Examples of aminodicarboxylic acids (2) are ω-aminocaproic acid, ω-aminoenanthic acid, ω-aminocaprylic acid, ω-aminopelargonic acid, ω-aminocapric acid, 11-aminoundecanoic acid and 12-aminododecanoic acid. Dicarboxylic acids of (3), for example, can be used as used for above-mentioned polyesters.

As diamines of (3), for example, are aliphatic diamines (such as ethylene diamine, diethylene triamine, triethylene tetramine, hexamethylenediamine, heptamethylene diamine, octamethylene diamine and decamethylene diamine), alicyclic diamines (such as isophrone diamine) and aromatic diamine (such as xyylene diamine). The amide-forming monomers cited above can be used with more than two kinds together.

The temperature when an absolute value of a complex coefficient of viscosity of said resin composition (|η*|) reaches 10,000 poises (hereinafter referred to as Tη), is preferably higher by at least 10° C., more preferably by at 15° C., than that of (B), from a view point of low temperature fixing properties.

The |η*| can be measured by a dynamicviscoelastmeter, for instance, RDS-7700II DYNAMICSSPECTROMETER (Rheometrics Inc. U.S.A.).

The resin composition preferably has a Tg lower by 1°–10° C. than that of (A), in view of a balance of the low temperature fixing properties and the thermal shelf stabilities. More preferred are 2°–8° C. lower.

Blending methods of (A) with (B) are not particularly restricted, and include, for example (1) kneading (A) and (B) at molten states under heating, (2) blending them in the presence of an organic solvent, followed by distillation of the solvent, (3) polymerizing one of them in the presence of the other.

The resin composition of this invention may further contain a compatibilizer (C). Examples of suitable (C) include graft or block copolymers having a block of styrenic polymer and/or copolymer of styrenic monomer with (meth)acrylate, and a block of the same polymer as (B). Mw of (C) is generally 2,500–100,000. A weight of (C) is generally 0–120% based on (B).

Illustrative synthetic methods of (C) include, in case (B) is polyester, (1) a method by polymerizing styrenic monomer and/or (meth)acrylate in the presence of a polyester (B) and a terminal double bond-containing polyester (D) prepared by reacting methacryloxy isocyanate with an OH group of a polyester produced in the same composition and polymerization method as (B); and (2) a method by polymerizing styrenic monomer and/or (meth)acrylate in the presence of a polyester containing a polymerizable double bond introduced thereinto with use of an unsaturated component such as maleic anhydride.

The resin composition of the invention may contain low molecular weight polyolefin (such as polyethylene and polypropylene) in an amount of 1–10% based on the total weight of the resin composition. But, measurement of molecular weight of the resin composition is carried out without the low molecular weight polyolefin.

Formulations of electrophotographic toners, wherein the resin composition of the present invention is used, include, for example, ones comprises generally 45–95% by weight of the resin composition, usually 5–10% by weight of known colorants (such as carbon black, ion black, benzidine yellow, quinacridone, rhodamine B, phthalocyanine and the like), and generally 0–50% by weight of magnetic powders (such as iron, cobalt, nickel, hematite, ferrite and the like).

In addition, there may be contained various additives (for example, charge controllers (such as metal complexes and nigrosine), lubricants (such as polytetrafluoroethylene, low molecular weight polyolefins, fatty acids and metal salts or amides thereof), and so on). The amount of these additives is usually 0–10% by weight based on the weight of toner.

Electrophotographic toner can be prepared by dry blending these components and then kneading under melt, followed by crushing and then finely pulverizing with a grinder, such as a jet grinder, into fine particles of 5–20, μm diameter.

The electrophotographic toner can be optionally mixed with carrier particles, such as iron powder, glass beads, nickel powder, ferrite and the like, and used as a developer for electrical latent images. In addition, a hydrophobic colloidal silica powder may be used to improve flowability of powders.

The electrophotographic toner can be used by fixing on substrates (such as paper, polyester film and the like). Fixation means are mentioned above.

Having generally described the invention, a more complete understanding can be obtained by reference to certain specific examples, which are included for purposes of illustration only and are not intended to be limiting unless otherwise specified.

In the following examples, parts and ratio mean parts by weight and weight ratio, respectively.

Measuring methods and conditions are as follows:

(1) Mw (molecular weight) measurement with GPC:

Equipment: HCL-802A, produced by Toyo Soda Manuf.

Columns: TSK gel GMHXL, 2 columns, produced by Toyo Soda Manuf.

Temperature: 40° C.

Sample solution: 0.5% THF solution.

Amount of solution: 200 microliters.

Detector: Refractometer.

Mw calibration curve was prepared using standard polystyrene.

(2) Tg:

Equipment: DSC20, SSC/580, produced by Seiko Electronics.

Conditions: ASTM D3418-2

(3) Dynamic viscoelasticity:

Equipment: RDS-770011, DYNAMICSSPECTROMETER produced by Rheometrics Inc. U.S.A.

Test fixture: cone and plate, 25 mm $\phi$

Temperature: 50°–180° C.

Frequency: 20 Hz (125.6 rad/sec).

Coefficient of strain: fixed at 5%.

Preparation Examples of (B)

(1) Preparation Example of a Polyester

Polycondensation reaction of 251 parts of isophthalic acid with 1,000 parts of bisphenol A PO 2 moles adduct was carried out to obtain 1,190 parts of a polyester (B-1), having Mn of 1,150, Mw of 1,950, Tg of 32C, AV of 0.5 mg KOH/g, OHV of 100 mg KOH/g and a T$\eta$; of 75° C., and calculated SP (SPb) was 10.19.

(2) Preparation Examples of Polyesters 500 parts of (B-1) and 89 parts of succinic acid anhydride were reacted at 160° C. for 2 hours, to obtain 580 parts of a polyester (B-2), having Mn of 1,400, Mw of 2,900, Tg of 40° C., AV of 92 mg KOH/g, OHV of 3 mg KOH/g and a T$\eta$ of 85° C. and calculated SP (SPb) was 10.19.

In the same manner as above, polyesters (B-3)-(B-11) were obtained. Those component and ratio were shown in Table 1, and results of the measurements were shown in Table 2.

(3) Preparation Example of Polyurethane Resin 282 parts of 4,4'-diphenylmethane diisocyanate and 1,000 parts of bisphenol A PO 3 moles adducts were reacted in methyl ethyl ketone at 80° C. for 6 hours, and the resulting product was treated with methanol to remove non-reacted isocyanate, followed by distillation, to obtain 1,270 parts of a polyurethane resin (B-12), having Mn of 1,200, Mw of 2,200, Tg of 30° C., OHV of 110 mg KOH/g, and a T$\eta$ of 72° C., and calculated SP(SPb) was 10.33.

(4) Preparation Example of Polyurethane Resin

In the same manner as above (3), 406 parts of 4,4'-diphenylmethane diisocyanate and 1,000 parts of bisphenol A PO 2 moles adducts were reacted to obtain 1,390 parts of a polyurethane resin (B-13), having Mn of 1,300, Mw of 2,700, Tg of 49° C., OHV of 95 mg KOH/g, and a T$\eta$ of 96° C., and calculated SP (SPb) was 10.77.

(5) Preparation Example of Epoxy Resin 1,000 parts of epoxy resin (EPICOTE 1001, produced by YUKASHELLEPOXY Inc.), 260 parts of benzoic acid and 2 parts of tetrabutylammonium bromide were reacted in xylene at 140° C. for 5 hours, followed by distillation, to obtain 1,250 parts of an epoxy resin (B-14), containing blocked terminal epoxy groups, having Mn of 1,600, Mw of 2,400, Tg of 39° C., and a T$\eta$ of 82° C., and calculated SP (SPb) was 11.2.

TABLE 1

| | Components of prepared polyesters | | |
|---|---|---|---|
| Nos. | diabasic acid component (1) | Dihydric alcohol component (2) | wt. Ratio (1)/(2) |
| B-1 | isophthalic acid | bisphenol A PO 2 moles adduct | 251/1,000 |
| B-2 | isophthalic acid | bisphenol A PO 2 moles adduct | 251/1,000 |
| B-3 | isophthalic acid | bisphenol A PO 2 moles adduct | 298/1,000 |
| B-4 | isophthalic acid | bisphenol A PO 2 moles adduct | 183/1,000 |
| B-5 | isophthalic acid | bisphenol A PO 2 moles adduct | 376/1,000 |
| B-6 | isophthalic acid | bisphenol A PO 3 moles adduct | 275/1,000 |
| B-7 | isophthalic acid | bisphenol A PO 3 moles adduct | 318/1,000 |
| B-8 | isophthalic acid | bisphenol A PO 3 moles adduct | 206/1,000 |
| B-9 | isophthalic acid | bisphenol A EO 2 moles adduct | 282/1,000 |

TABLE 1-continued

Components of prepared polyesters

| Nos. | diabasic acid component (1) | Dihydric alcohol component (2) | wt. Ratio (1)/(2) |
|---|---|---|---|
| B-10 | isophthalic acid | bisphenol A EO 2 moles adduct | 375/1,000 |
| B-11 | isophthalic acid | bisphenol A EO 2 moles adduct | 183/1,000 |

TABLE 2

Results of measurements

| Nos. | Mn | Mw | Tg °C. | AV mg KOH/g | OHV mg KOH/g | Tη °C. | SPb |
|---|---|---|---|---|---|---|---|
| B-1  | 1,150 | 1,950 | 32 | 0.5  | 100 | 75  | 10.19 |
| B-2  | 1,400 | 2,900 | 40 | 92.0 | 3   | 85  | 10.19 |
| B-3  | 1,470 | 3,090 | 42 | 0.8  | 85  | 88  | 10.19 |
| B-4  | 800   | 1,400 | 19 | 0.4  | 165 | 61  | 11.01 |
| B-5  | 2,600 | 5,400 | 57 | 1.2  | 53  | 104 | 10.19 |
| B-6  | 1,760 | 3,380 | 27 | 1.0  | 75  | 70  | 9.96  |
| B-7  | 2,400 | 5,010 | 36 | 1.2  | 57  | 80  | 9.96  |
| B-8  | 1,260 | 2,090 | 14 | 1.0  | 98  | 55  | 10.73 |
| B-9  | 1,150 | 2,090 | 26 | 0.7  | 102 | 69  | 10.44 |
| B-10 | 2,000 | 3,800 | 45 | 1.1  | 70  | 91  | 10.44 |
| B-11 | 750   | 1,300 | 12 | 0.5  | 170 | 54  | 11.36 |
| B-12 | 1,200 | 2,200 | 30 | —    | 110 | 72  | 10.33 |
| B-13 | 1,300 | 2,700 | 49 | —    | 95  | 96  | 10.77 |
| B-14 | 1,600 | 2,400 | 39 | —    | —   | 82  | 11.20 |

Ex (6) Preparation Example of Binder Resin

Into a flask equipped with a condenser and a stirrer, were charged 36 parts of copolymer (A-H-1) of styrene/n-butyl acrylate (weight ratio=78/22), having Mn of 260,000, Mw of 630,000, and Tg of 64° C., prepared through suspension polymerization, and 64 parts of copolymer (A-L-1) of styrene/n-butyl acrylate (weight ratio=96/4), having Mn of 2,600, Mw of 6,300 and Tg of 61° C., prepared through solution polymerization, followed by substituting the atmosphere in the flask with nitrogen, then adding 120 parts of xylene and further substituting the atmosphere with nitrogen. The mixture was heated under stirring to a reflux temperature, and stirring was continued for additional 4 hours under reflux. Thereafter, the volatile materials were distilled off under normal pressure heating up to 180° C. and then under reduced pressure at 180° C., followed by continuing distillation for 1.5 hours after reaching 20 torrs.

The molten mixture was cooled to a room temperature to obtain a binder resin (A-1), having Mn of 3,800, Mw of 180,000, Tg of 62° C., and Tη of 121° C., and calculated solubility parameter (SPa) was 10.03.

(7) Preparation Example of Binder Resin

As a same manner of (A-1) except using 30 parts of copolymer of styrene/n-butyl acrylate (A-H-2, weight ratio= 79/21), having Mn of 280,000, Mw of 820,000, and Tg of 66° C., prepared through suspension polymerization, and 70 parts of copolymer of styrene/n-butyl acrylate/acrylic acid (A-L-2, weight ratio=94.5/3.0/2.5), having Mn of 2,100, Mw of 4,000 and Tg of 63° C., prepared through solution polymerization, a binder resin (A-2), having Mn of 2,700, Mw 200,000, Tg of 64° C., and a Tη of 122° C., was obtained, and calculated solubility parameter (SPa) was 10.09.

EXAMPLES 1–8

COMPARATIVE EXAMPLES 1–7

Into a flask equipped with a condenser and a stirrer, were charged each resin (B) shown in Table 2, and the resin (A-1) or (A-2), in a ratio shown in Table 3, followed by substituting the atmosphere in the flask with nitrogen, then adding 120 parts of xylene and further substituting the atmosphere with nitrogen.

Each mixture was heated under stirring to a flux temperature, and stirring was continued for additional 4 hours under reflux. Thereafter, the volatile materials were distilled off under normal pressure heating up to 180° C., and then under reduced pressure at 180° C., followed by continuing distillation for 1.5 hours after reaching 20 torrs.

Each molten mixture was cooled to a room temperature, were obtained the resin compositions of Examples 1–8 ((TB-1)–(TB-8)) and Comparative examples 1–7 ((TB-9)–(TB-15)).

TABLE 3

Compositions and Results of the Measurements of the Resin Compositions

Examples

| Nos. | Resin Comp. | (A) | (B) | A/B Wt Ratio | Mw × 10⁴ | Mn × 10³ | Tη °C. | Tg °C. | SPb-SPa |
|---|---|---|---|---|---|---|---|---|---|
| 1 | TB-1 | A-1 | B-1  | 90/10 | 16 | 3.1 | 116 | 54     | 0.16  |
| 2 | TB-2 | A-2 | B-2  | 90/10 | 18 | 2.6 | 116 | 56     | 0.10  |
| 3 | TB-3 | A-2 | B-3  | 75/25 | 15 | 2.3 | 113 | 56, 48 | 0.10  |
| 4 | TB-4 | A-2 | B-4  | 95/5  | 19 | 2.5 | 113 | 53     | 0.92  |
| 5 | TB-5 | A-1 | B-6  | 90/10 | 16 | 3.5 | 116 | 58, 36 | -0.07 |
| 6 | TB-6 | A-1 | B-7  | 85/15 | 15 | 3.5 | 116 | 57, 40 | -0.07 |
| 7 | TB-7 | A-2 | B-9  | 95/5  | 19 | 2.7 | 116 | 57, 30 | 0.35  |
| 8 | TB-8 | A-2 | B-12 | 90/10 | 18 | 2.5 | 117 | 59, 35 | 0.24  |

| Nos. | Resin Comp. | (A) | (B) | A/B Wt Ratio | Mw × 10⁴ | Mn × 10³ | Tη °C. | Tg °C. | SPb-SPa |
|---|---|---|---|---|---|---|---|---|---|
| 1 | TB-9  | A-1 | B-5 | 75/25 | 14 | 3.4 | 118 | 59     | 0.16 |
| 2 | TB-10 | A-1 | B-1 | 60/40 | 11 | 2.0 | 110 | 53, 34 | 0.16 |
| 3 | TB-11 | A-1 | B-8 | 80/20 | 14 | 2.7 | 100 | 42     | 0.70 |

TABLE 3-continued

| | | | | | | | | |
|---|---|---|---|---|---|---|---|---|
| 4 | TB-12 | A-2 | B-10 | 90/10 | 18 | 2.7 | 118 | 61, 51 | 0.35 |
| 5 | TB-13 | A-1 | B-11 | 95/5 | 17 | 3.2 | 118 | 58, 20 | 1.33 |
| 6 | TB-14 | A-1 | B-13 | 90/10 | 16 | 3.2 | 118 | 58 | 0.74 |
| 7 | TB-15 | A-1 | B-14 | 90/10 | 16 | 3.4 | 118 | 62,50 | 1.17 |

Preparation of Toners

To 88 parts of each resin composition, were added and homogeneously mixed 7 parts of carbon black (MA100 produced by Mitsubishi Chemical Industries), 3 parts of a low molecular weight polypropylene (Viscol 550P, produced by Sanyo Chemical Industries) and 2 parts of a charge controller (Spironblack TRH produced by Hodogaya Chemical Co.), and thereafter kneaded with a twin-screw extruder of bulk temperature 150° C., followed by finely pulverizing the cooled kneaded mixture with a jet mill and then classifying with a dispersion separator to obtain toners (a)–(o) of average diameter of 12 μm.

Evaluation of Toners (1) To 3 parts of each toner were added and homogeneously mixed 97 parts of ferrite carrier (F-100 produced by Powdertech Co.), and fixing test was carried out as follows. By using a commercially available copy machine (BD-7720 produced by Toshiba Corp.), toner image was transferred onto paper, and then the transferred toner on the paper was fixed at a speed of 35 A4 sheets/minute with use of another commercially available copy machine (SF8400A produced by Sharp Corp.), whose fixing parts had been modified.

(2) Each toner was put into a polyethylene bottle, and maintained at 45° C. within a constant temperature water bath for 8 hours. Then resulting toner was removed into a sieve of 42 mesh and shaken for 10 seconds using a powder tester (produced by Hosokawamicron, Co.). By measuring the weight % of the toner remained on the sieve, thermal shelf stability was evaluated. The smaller the weight % is, the better the heat storage stability is.

(3) Into a 50 cm³ glass bottle, 3 parts of each toner and 97 parts of ferrite carrier (F-100 produced by Powdertech Co.) were charged, and allowed to stand for 12 hours within a temperature and humidity controlled room of 25° C. and 50% R.H. Then, the resulting, toner was stirred for 30 minutes at 100 r.p.m. with a tubular shaker mixer under conditions of 25° C. and 50% R.H. to be electrostatically charged by friction. Thereafter, the charged amount was measured with a blow-off charge amount measuring device (produced by Toshiba, Corp.). The test results were shown in Table 4.

TABLE 4

The Test Results of Toners

Examples

| Toner Binder | MFT (°C.) *1 | HOT (°C.) *2 | Thermal Stability (%) | Charge Amount (μ c/g) |
|---|---|---|---|---|
| a TB-1 | 140 | >220 | 28 | −20 |
| b TB-2 | 140 | >220 | 25 | −23 |
| c TB-3 | 135 | >220 | 38 | −22 |
| d TB-4 | 140 | >220 | 36 | −22 |
| e TB-5 | 140 | >220 | 32 | −20 |
| f TB-6 | 140 | >220 | 38 | −20 |
| g TB-7 | 140 | >220 | 35 | −19 |

TABLE 4-continued

The Test Results of Toners

| | | | | |
|---|---|---|---|---|
| h TB-8 | 140 | >220 | 30 | −19 |

Comparative Examples

| Toner Binder | MFT (°C.) *1 | HOT (°C.) *2 | Thermal Stability (%) | Charge Amount (μ c/g) |
|---|---|---|---|---|
| i TB-9 | 145 | >220 | 30 | −22 |
| j TB-10 | 135 | 200 | 83 | −20 |
| k TB-11 | 130 | >220 | 96 | −19 |
| l TB-12 | 150 | >220 | 61 | −15 |
| m TB-13 | 150 | >220 | 50 | −15 |
| n TB-14 | 155 | >220 | 35 | −14 |
| o TB-15 | 155 | >220 | 40 | −12 |

*1: the temperature of the heated roller providing printed image density of solid part remained at least 70% after 5 times reciprocating rubbing of black solid part of printed image density 1.2 with a Gakushin fastness tester (rubbed part is paper).
*2: the temperature of the heated roller at the time when toner was hot offset.

As shown in Table 4, toners of Examples a–h of the invention exhibited well balanced low temperature fixability and cohesiveness as compared with toners of Comparative Examples i–o, and improved dispersability and charging properties as compared with toners of Comparative Examples i–o.

Obviously, numerous modifications and variations of the present invention are possible in light of the above teachings. It is therefore to be understood that within the scope of the appended claims, the invention may be practiced otherwise than as specifically described herein.

This application is based on JP 44871/1994, filed in Japan on Feb. 17, 1994, the entire contents of which are hereby incorporated by reference.

What is claimed as new and desired to be secured by Letters Patent of the United States is:

1. A resin composition suitable for electrophotographic toner, comprising:

(A) a styrenic polymer or a copolymer of a styrenic monomer with (meth)acrylic monomer or maleic monomer, wherein said (meth)acrylic monomer is selected from the group consisting of (meth)acrylic acid and $C_{1-50}$ alkyl(meth)acrylates, and mixtures thereof, and wherein said polymer or copolymer has a weight average molecular weight of less than 500,000, (B) a non-crosslinked non-crystallizable polymer having a polar group selected from the group consisting of hydroxyl group, carboxyl group, amino group, amide group, epoxy group and nitrile group, wherein:

(1) the weight ratio of (B)/(A) is in the range of (0.01–0.5)/1;

(2) said resin composition has at least one glass transition temperature in the range of 50°–70° C.;

(3) (B) has a glass transition temperature in the range of 15°–55° C., and (A) has a glass transition temperature higher than that of (B);

(4) a ratio of a weight average molecular weight of said resin composition, to a weight average molecular weight of (B) (Mwd/Mwb), is in the range of 20–1,000

(5) (B) has a number average molecular weight (Mnb) in the range of 500–2,500; and (6) (A) and (B) have solubility parameters, satisfying the following equation (1);

$$-5.5\times 10^{-4}\, Mnb + 0.74 \leqq SPb - SPa \leqq -5.5\times 10^{-4}\, Mnb + 1.39 \quad (1)$$

wherein SPa is the solubility parameter of (A), and SPb is the solubility parameter of (B).

2. The resin composition of claim 1, wherein a temperature when an absolute value of a complex coefficient of viscosity of said resin composition ($|\eta^*|$) reaches 10,000 poises, is higher by at least 10° C. than that of (B).

3. The resin composition of claim 1, wherein a glass transition temperature of said resin composition is lower by 1°–10° C. than that of (A).

4. The resin composition of claim 1, wherein said polar group of (B) is a hydroxyl group or a carboxyl group.

5. The resin composition of claim 1, wherein (B) is a polyester.

6. The resin composition of claim 5, wherein (B) is a polyester, the terminal group of which has been reacted with a succinic acid anhydride.

7. The resin composition of claim 1, wherein (B) is a polyurethane.

8. The resin composition of claim 1, wherein (B) is selected from the group consisting a copolymer of a styrene with a (meth)acrylate, a styrenic polymer and a (meth)acrylate polymer.

9. The resin composition of claim 1, further comprising a compatibilizer (C).

10. The resin composition of claim 9, wherein said compatibilizer is graft or block copolymer having a block of styrenic polymer and/or copolymer of styrenic monomer with (meth)acrylate, and a block of the same polymer as (B).

11. The resin composition of claim 9, wherein said compatibilizer has a Mw 2,500–100,000.

12. The resin composition of claim 9, wherein said compatibilizer is in an amount 0–120% based on (B).

13. An electrophotographic toner comprising:

i) 45–95% by weight of a resin composition comprising:

(A) a styrenic polymer or a copolymer of a styrenic monomer with (meth)acrylic monomer or maleic monomer, wherein said (meth)acrylic monomer is selected from the group consisting of (meth)acrylic acid and $C_{1-50}$ alkyl(meth)acrylates, and mixtures thereof, and wherein said polymer or copolymer has a weight average molecular weight of less than 500,000, (B) a non-crosslinked non-crystallizable polymer having a polar group selected from the group consisting of hydroxyl group, carboxyl group, amino group, amide group, epoxy group and nitrile group, wherein:

(1) the weight ratio of (B)/(A) is in the range of (0.01–0.5)/1;

(2) said resin composition has at least one glass transition temperature in the range of 50°–70° C.;

(3) (B) has a glass transition temperature in the range of 15°–55° C., and (A) has a glass transition temperature higher than that of (B);

(4) a ratio of a weight average molecular weight of said resin composition, to a weight average molecular weight of (B) (Mwd/Mwb), is in the range of 20–1,000;

(5) (B) has a number average molecular weight (Mnb) in the range of 500–2,500; and (6) (A) and (B) have solubility parameters, satisfying the following equation (1);

$$-5.5\times 10^{-4}\, Mnb + 0.74 \leqq SPb - SPa \leqq -5.5\times 10^{-4}\, Mnb + 1.39 \quad (1)$$

wherein SPa is the solubility parameter of (A), and SPb is the solubility parameter of (B);

ii) 1–10% by weight of a colorant; and iii) 0–50% by weight of a magnetic powder.

* * * * *